United States Patent [19]
Ohkuma

[11] Patent Number: 5,517,073
[45] Date of Patent: May 14, 1996

[54] PRESSURE SENSOR

[75] Inventor: Shigeo Ohkuma, Atsugi, Japan

[73] Assignee: Unisia Jecs Corporation, Atsugi, Japan

[21] Appl. No.: 277,026

[22] Filed: Jul. 19, 1994

Related U.S. Application Data

[63] Continuation of Ser. No. 35,120, Mar. 18, 1993, abandoned.

[30] Foreign Application Priority Data

Mar. 19, 1992 [JP] Japan ................................ 4-093430

[51] Int. Cl.⁶ .................................................. H01L 41/08
[52] U.S. Cl. ............................................. 310/315; 310/338
[58] Field of Search ..................................... 310/315, 338

[56] References Cited

U.S. PATENT DOCUMENTS

| | | | |
|---|---|---|---|
| 2,157,665 | 5/1939 | Hollmann | 310/315 |
| 2,250,496 | 7/1941 | Postlethwaite | 310/338 |
| 2,454,264 | 11/1948 | Stigter | 310/338 |
| 3,185,869 | 5/1965 | Shoor | 310/315 |
| 3,940,974 | 3/1976 | Taylor | 73/88.5 R |
| 4,608,506 | 8/1986 | Tanuma | 310/315 |
| 5,168,192 | 12/1992 | Kosugi et al. | 310/338 |

FOREIGN PATENT DOCUMENTS

| | | |
|---|---|---|
| 0430445 | 5/1991 | European Pat. Off. . |
| 1252438 | 4/1974 | Germany . |
| 3423711 | 1/1985 | Germany . |
| 60-535 | 5/1985 | Japan . |
| 404313037 | 11/1992 | Japan ........................ 310/315 |

*Primary Examiner*—Mark O. Budd
*Attorney, Agent, or Firm*—Foley & Lardner

[57] ABSTRACT

A pressure sensor comprises a movable structure which is movable in accordance with a pressure applied thereto. A piezoelectric transducer is employed against which a pressure is applied when the movable structure is moved. The transducer has opposed electrodes between which a voltage is generated when the transducer is pressed. The capacitance between the opposed electrodes increases with increase of temperature. A dielectric member is arranged in the vicinity of the piezoelectric transducer. The dielectric member has opposed electrodes the capacitance between which decreases with increase of temperature. The piezoelectric transducer and the dielectric member are electrically connected in series.

21 Claims, 5 Drawing Sheets

PRESSURE SENSOR

This application is a continuation of application Ser. No. 08/035,120, filed Mar. 18, 1993, now abandoned.

BACKGROUND OF THE INVENTION

1. Field of the Invention

The present invention relates in general to pressure sensors, and more particularly, to pressure sensors of a type which can detect the pressure in a combustion chamber of an internal combustion engine or the like.

2. Description of the Prior Art

In order to clarify the task of the present invention, one conventional pressure sensor of the above-mentioned type will be outlined, which is a combustion pressure sensor disclosed in Japanese Utility Model First Provisional Publication No. 60-535.

The sensor comprises generally a casing, a diaphragm integrally mounted to the casing in a manner to axially move in accordance with an external pressure applied thereto, a transmission rod received in the casing and having one end engaged with the diaphragm, and a piezoelectric transducer having the other end of the transmission rod connected thereto. Thus, the piezoelectric transducer outputs a voltage signal which is varied in accordance with the external pressure applied to the diaphragm.

The piezoelectric transducer used in the above-mentioned pressure sensor is of a so-called "d33" type, which will be described in the following with reference to FIGS. 6 and 7 of the accompanying drawings.

In FIG. 6, denoted by numeral 1 is a transducer proper which is constructed of a piezoelectric material such as lead titanate or the like. The transducer proper 1 has upper and lower surfaces on which respective electrodes 1A and 1B of conductive paste are provided. Although not shown, the transducer proper 1 has a portion to which the transmission rod is connected, and the electrodes 1A and 1B are electrically connected through conductive paths to a control unit. At the time of production of the transducer proper 1, the same is subjected to a high electric field through the electrodes 1A and 1B, so that spontaneous polarization is oriented to cause the polarization axis "P" to extend axially as shown. Thus, when a pressure (or stress) is applied to the transducer proper 1 from the stress axis "F" which is in parallel with the polarization axis "P", a certain distortion appears in the transducer proper 1 and thus an electric charge (viz., voltage signal) having a magnitude corresponding to the distortion is outputted through the electrodes 1A and 1B in the direction of the signal axis "V".

In practical use, the pressure sensor is fixed to a cylinder head of an internal combustion engine having the diaphragm exposed to a combustion chamber of the engine. Thus, the combustion pressure in the combustion chamber moves the diaphragm and thus presses through the transmission rod the transducer proper 1. Thus, the pressure sensor outputs a voltage signal which is varied in accordance with the combustion pressure of the engine.

However, due to its inherent construction, the above-mentioned pressure sensor has the following drawback.

That is, during operation of the engine, the heat in the combustion chamber is transmitted through the casing to the transducer proper 1 to heat the same. However, as is understood from the graph of FIG. 7, the characteristic (viz., output) of the transducer proper 1 is varied in accordance with the temperature, which thus needs a temperature compensation when measuring the combustion pressure with accuracy.

In view of this fact, hitherto, a measure has been employed in which a temperature sensor, such as thermocouple, thermistor or the like, is fixed to the pressure sensor to detect the temperature of the transducer proper 1, and a control unit is so designed as to correct the output (viz., pressure representing signal) from the pressure sensor based on the temperature detected by the temperature sensor. However, even in such measure, usage of two sensors (viz., pressure sensor and temperature sensor) causes not only a complicated construction of the control unit, but also a bulky construction of the pressure sensor.

SUMMARY OF THE INVENTION

It is therefore an object of the present invention to provide a pressure sensor which is free of the above-mentioned drawbacks.

According to a first aspect of the present invention, there is provided a pressure sensor which comprises a movable structure movable in accordance with a pressure applied thereto; a piezoelectric transducer against which a pressure is applied when the movable structure is moved, the transducer having opposed electrodes between which a voltage is generated when the transducer is pressed, the capacitance between the opposed electrodes increasing with increase of temperature; and a dielectric member arranged in the vicinity of the piezoelectric transducer, the dielectric member having opposed electrodes the capacitance between which decreases with increase of temperature, wherein the piezoelectric transducer and the dielectric member are electrically connected in series.

According to a second aspect of the present invention, there is provided a pressure sensor which comprises a cylindrical casing having a diaphragm portion which is axially movable when applied with an external pressure; a transmission rod axially movably received in the cylindrical casing, the transmission rod having one end engaged with the diaphragm portion; a stopper tightly received in the cylindrical casing in such a manner as to define a certain clearance between the stopper and the other end of the transmission rod; a piezoelectric transducer interposed between the certain clearance, the transducer having opposed electrodes between which a voltage is generated when the transducer is pressed, the capacitance between the opposed electrodes increasing with increase of temperature; a dielectric member interposed between the certain clearance, the dielectric member having opposed electrodes the capacitance between which decreases with increase of temperature; and tightening means for assuring a tight mechanical connection of the piezoelectric transducer and the dielectric member within the certain clearance, wherein the piezoelectric transducer and the dielectric member are electrically connected in series.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
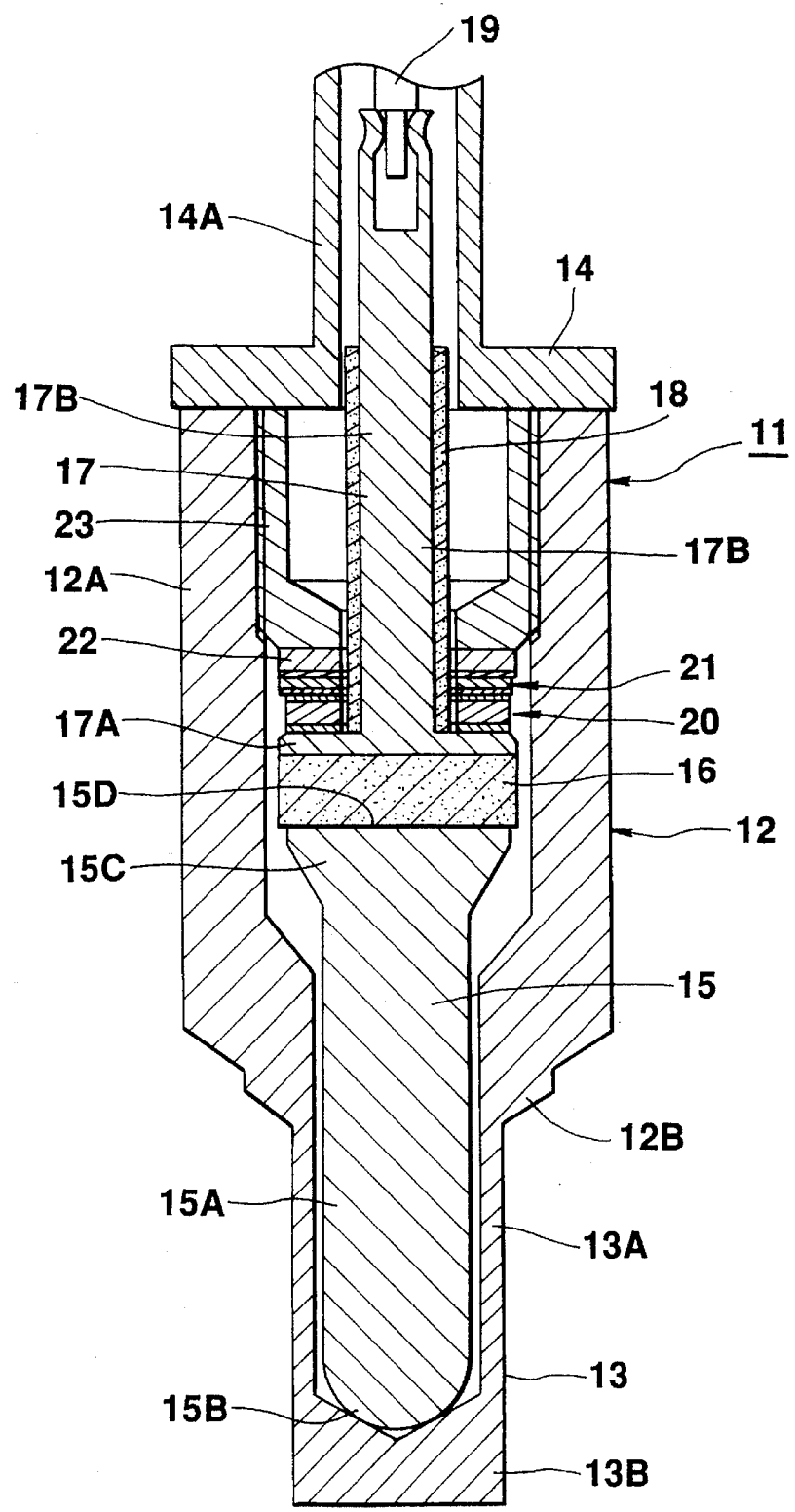
FIG. 1 is a sectional view of a pressure sensor according to the present invention.

Referring to FIGS. 1 to 4, particularly FIG. 1, there is shown a pressure sensor according to the present invention, which is a combustion pressure sensor. In FIG. 1, denoted by numeral 11 is a casing, and denoted by numeral 12 is a casing proper which constitutes the casing 11 together with an after-mentioned diaphragm 13 and an upper cover 14. The casing proper 12 has an upper open end closed by the upper cover 14, and comprises generally three portions, which are a larger diameter cylindrical portion 12A which contains therein a contact member 17 and a piezoelectric transducer 20, a tapered shoulder portion 12B which extends downward from the cylindrical portion 12A and a smaller diameter cylindrical portion 13 which extends downward from the tapered shoulder portion 12B and contains therein a transmission rod 15. The smaller diameter cylindrical portion 13 has a thinner cylindrical wall 13A and thus can serve as a diaphragm. Although not shown in the drawing, in practical use, the pressure sensor is tightly received in a bore formed in a cylinder head of an associated internal combustion engine in such a manner that the smaller diameter cylindrical portion 13 (viz., diaphragm portion) is exposed to the combustion chamber. The bore of the cylinder head has a tapered step against which the tapered shoulder portion 12B of the pressure sensor abuts upon assembly.

As shown in FIG. 1, the smaller diameter cylindrical portion 13 has a lower closed thicker end 13B which is circular in shape. That is, when the closed thicker end 13B is applied with a pressure in the combustion chamber, the thinner cylindrical wall 13A axially contracts moving the transmission rod 15 in the axial direction.

The upper cover 14 is circular in shape and welded, through a laser-welding technique or the like, to the upper open end of the larger diameter cylindrical portion 12A of the casing proper 12. The upper cover 14 is integrally formed with a tubular portion 14A which extends upward. As will be described in detail hereinafter, a lead cable 19 is received in the tubular portion 14A.

The transmission rod 15 is constructed of a stainless steel or the like. As shown in FIG. 1, the rod 15 is axially movably received in a lower portion of the casing proper 12. The rod 15 comprises a smaller diameter major portion 15A, a rounded lower end 15B which is in contact with an inner surface of the lower closed thicker end 13B of the diaphragm portion 13, a tapered upper portion 15C and a larger diameter head portion 15D. Thus, when, due to the pressure in the combustion chamber, the diaphragm portion 13 is forced to axially contract, the lower closed thicker end 13B of the diaphragm portion 13 lifts the rod 15 in the casing proper 12. As will become apparent as the description proceeds, the axial movement of the rod 15 applies a certain pressure to the piezoelectric transducer 20 through a lower plate 16.

The lower plate 16 is circular in shape and constructed of electrically and thermally insulated material, such as a ceramic or the like. The lower plate 16 is arranged between the transmission rod 15 and the piezoelectric transducer 20. That is, the lower plate 16 is put on the head portion 15D of the transmission rod 15 to move therewith, as shown. Because of the nature of the lower plate 16, the casing 11, the rod 15 and an after-mentioned contact member 17 are electrically insulated from one another, and the heat transfer from the transmission rod 15 to the piezoelectric transducer 20 is minimized.

The contact member 17 is constructed of a conductive member and installed in the larger diameter cylindrical portion 12A of the casing proper 12. The contact member 17 comprises a circular contact plate portion 17A which is put on the lower plate 16 and a rod portion 17B which extends upward from the circular contact plate portion 17A. The rod portion 17B has an insulating tube 18 put thereabout. Due to provision of the insulating tube 18, the contact member 17, an after-mentioned stopper screw 23 and the upper cover 14 are insulated from one another. An upper part of the rod portion 17B is led into the tubular portion 14A of the upper cover 14 and has the lead cable 19 secured thereto. The lead cable 19 extends to a control unit (not shown).

The piezoelectric transducer 20 is annular in shape and installed within the larger diameter cylindrical portion 12A of the casing proper 12. The annular piezoelectric transducer 20 is put on the contact plate portion 17A having the rod portion 17B of the contact member 17 passed through a circular opening thereof.

Figure 2:
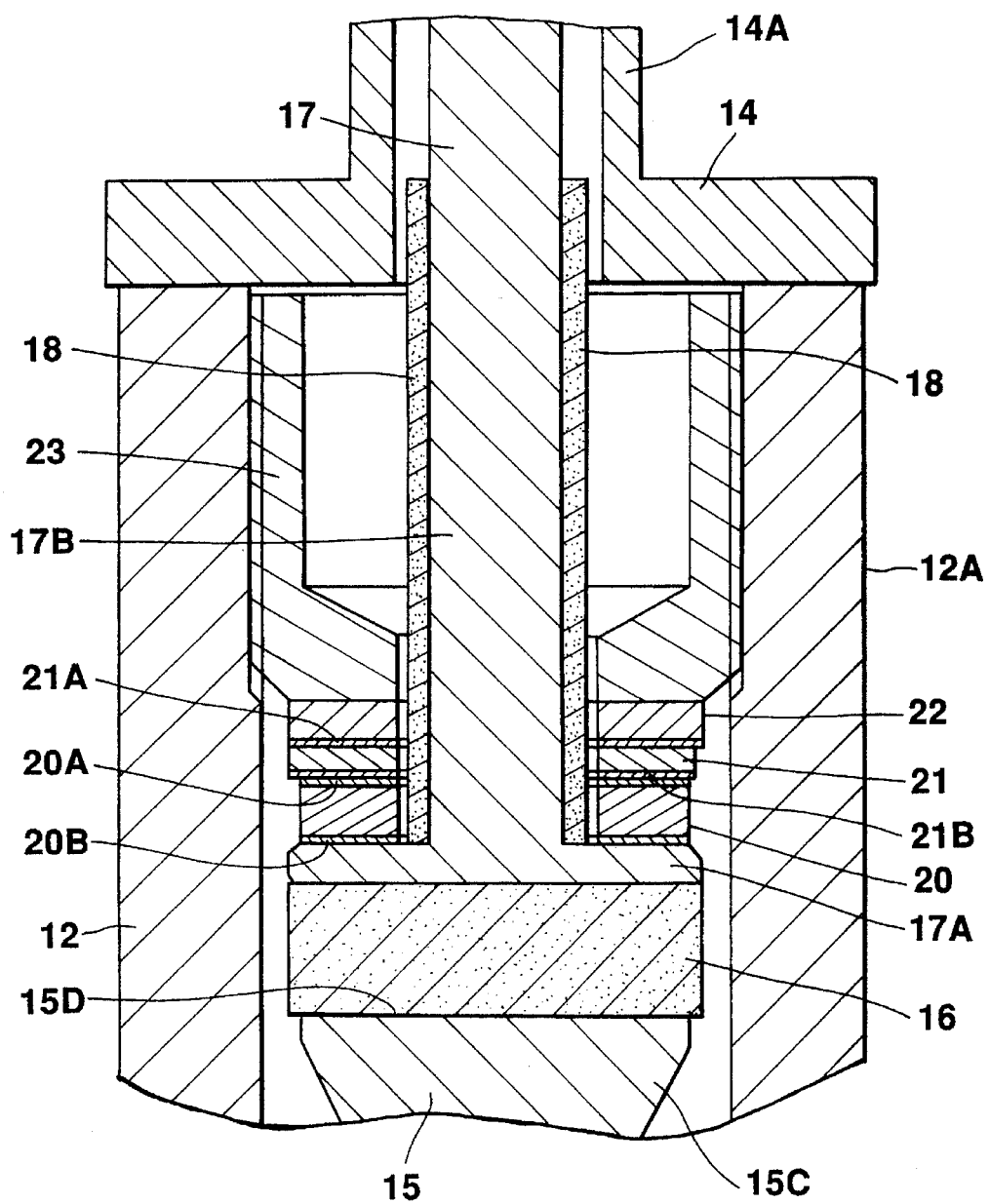
FIG. 2 is an enlarged view of an essential portion of FIG. 1.

As is best shown in FIG. 2, the piezoelectric transducer 20 comprises a transducer proper constructed of a piezoelectric material such as lead titanate or the like, and upper and lower electrodes 20A and 20B provided on upper and lower surfaces of the transducer proper.

As is best seen from FIG. 2, an annular unit consisting of an annular dielectric member 21, an annular upper plate 22 and a cylindrical stopper screw 23 is coaxially put on the piezoelectric transducer 20 while coaxially surrounding the rod portion 17B of the contact member 17. The stopper screw 23 is tightly engaged with an internal thread (no numeral) formed on an inner cylindrical surface of the casing proper 12. Thus, a unit consisting of the annular piezoelectric transducer 20, the annular dielectric member 21 and the annular upper plate 22 is tightly sandwiched between the contact plate portion 17A of the contact member 17 and a lower flat end (no numeral) of the stopper screw 23. Thus, the upper electrode 20A of the piezoelectric transducer 20 is grounded through the dielectric member 21, the upper plate 22, the stopper screw 23 and the casing proper 12. While, the lower electrode 20B of the piezoelectric transducer 20 is in contact with an upper surface of the contact plate portion 17A of the contact member 17 and thus connected to the lead cable 19.

When the piezoelectric transducer 20 is applied with a positive or negative pressure through the transmission rod 15 and the lower plate 16, polarization is produced in the transducer 20 due to distortion appearing therein and thus the transducer 20 outputs a voltage varied in accordance with the pressure.

Figure 3:
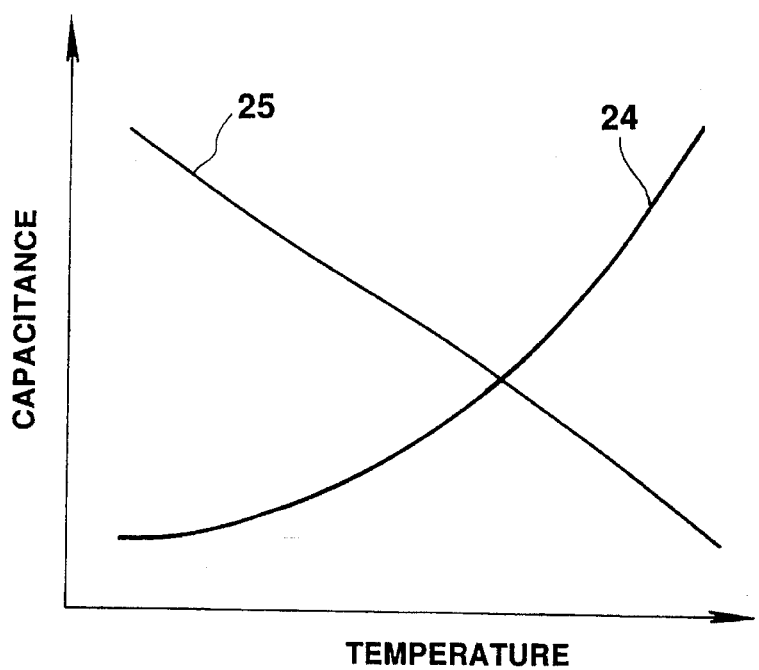
FIG. 3 is a graph showing characteristic curves of both a piezoelectric transducer and a dielectric member, in terms of a relationship between a temperature and a capacitance.

It is to be noted that, as is understood from the characteristic curve 24 of FIG. 3, the capacitance between the upper and lower electrodes 20A and 20B of the piezoelectric transducer 20 increases with increase of the temperature.

The annular dielectric member 21 is constructed of strontium titanate. The dielectric member 21 has upper and lower electrodes 21A and 21B, so that the member 21 can act as a condenser.

As is seen from the characteristic curve 25 of FIG. 3, at the room temperature, the dielectric member 21 has the capacitance about six times as large as the piezoelectric transducer 20, and the capacitance of the dielectric member 21 reduces with increase of the temperature.

As is shown in FIG. 2, the lower electrode 21B of the dielectric member 21 contacts with the upper electrode 20A of the piezoelectric transducer 20 and the upper electrode 21A of the dielectric member 21 contacts with the upper plate 22. Thus, the dielectric member 21 and the piezoelectric transducer 20 are electrically connected in series between the contact member 17 and the stopper screw 23.

The annular upper plate 22 is constructed of a thin metal member, which assures the mechanical and electric connection between the dielectric member 21 and the stopper screw 23.

The cylindrical stopper screw 23 has the lower reduced flat end pressed against the upper plate 22. Thus, by turning the stopper screw 23 relative to the casing proper 12, an initial pressure or load applied to the piezoelectric transducer 20 can be adjusted.

In the following, operation of the pressure sensor of the invention will be described with reference to FIGS. 1, 3 and 4. For ease of understanding, the description will be made with respect to a condition wherein the pressure sensor is used for sensing the pressure in a combustion chamber of an internal combustion engine. That is, the pressure sensor is connected to the cylinder head of the engine having the diaphragm portion 13 exposed to the combustion chamber.

When, due to combustion of air-fuel mixture, a combustion pressure is produced in the combustion chamber, the diaphragm portion 13 axially contracts. Due to this contract, the transmission rod 15 moves axially upward in FIG. 1, pressing the piezoelectric transducer 20 through the lower plate 16 and the contact plate portion 17A. Thus, the transducer 20 produces a voltage which is fed to a control unit (not shown) through the conductive paths.

When, due to high heat in the combustion chamber, the temperature of the casing 11 is increased, the capacitance of the piezoelectric transducer 20 is forced to increase as shown by the characteristic curve 24 of FIG. 3.

However, in accordance with the present invention, the increase in capacitance of the piezoelectric transducer 20 can be canceled due to provision of the dielectric member 21 which is electrically connected to the transducer 20 in series. That is, as is understood from the characteristic curve 25 of FIG. 3, the capacitance of the dielectric member 21 decreases with increase of the temperature, which phenomenon can cancel the opposite phenomenon of the transducer 20.

Figure 4:
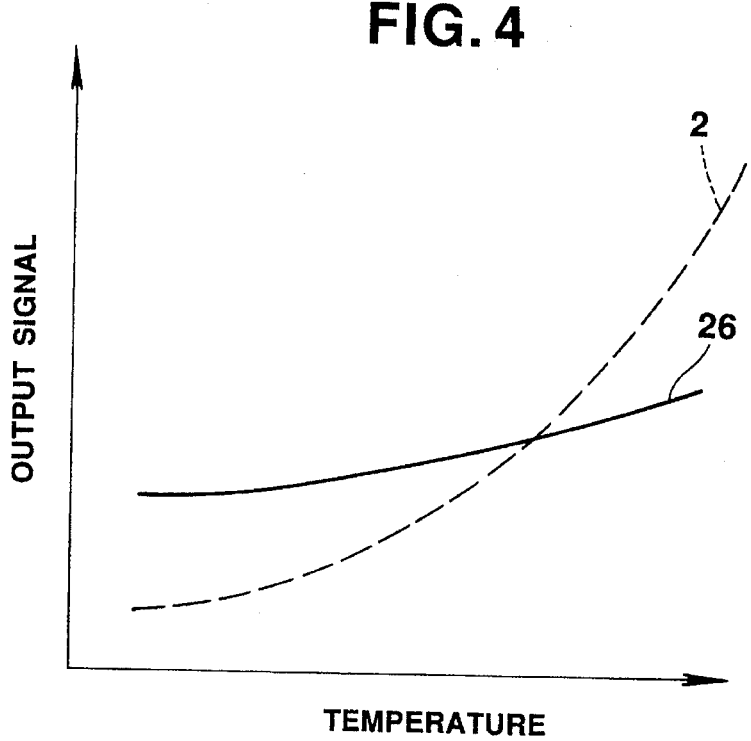
FIG. 4 is a graph showing a characteristic curve of the pressure sensor in terms of a relationship between a temperature and a detected signal.

In fact, as is seen from the characteristic curve 26 of FIG. 4, a voltage signal outputted from the pressure sensor of the invention is less affected by the temperature as compared with that (shown by the curve 2) of the conventional pressure sensor. That is, in the present invention, the undesired influence of the temperature on the output characteristic of the pressure sensor is minimized.

Figure 5:
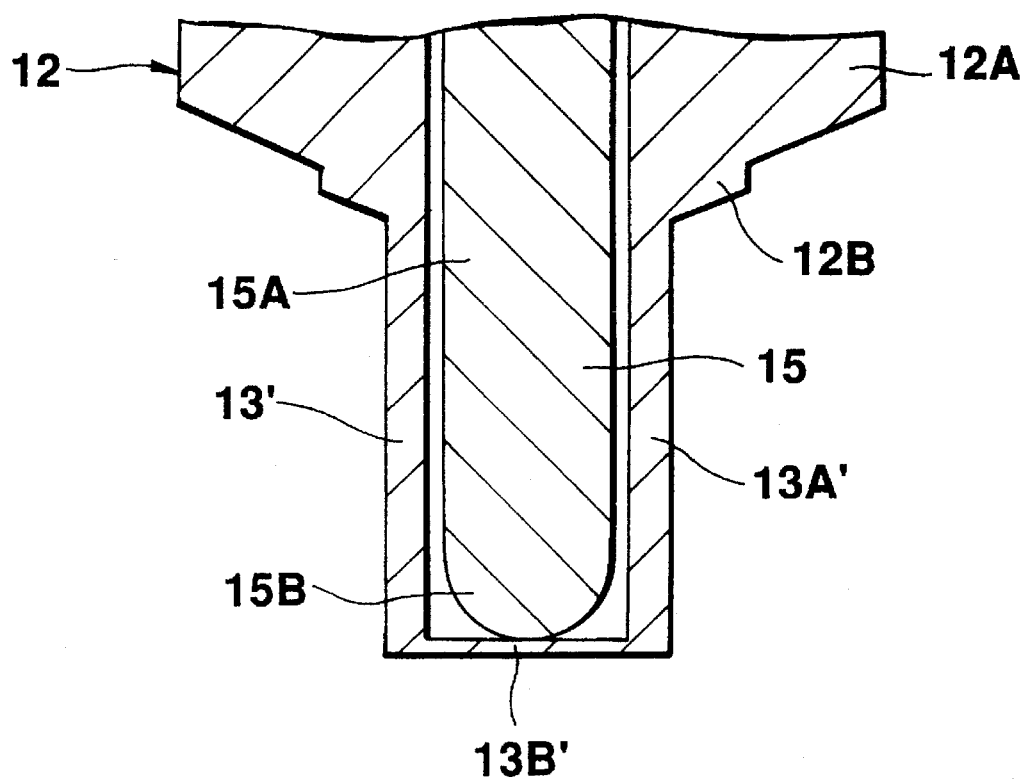
FIG. 5 is a partial view of a modification of the pressure sensor of the present invention.
Figure 6:
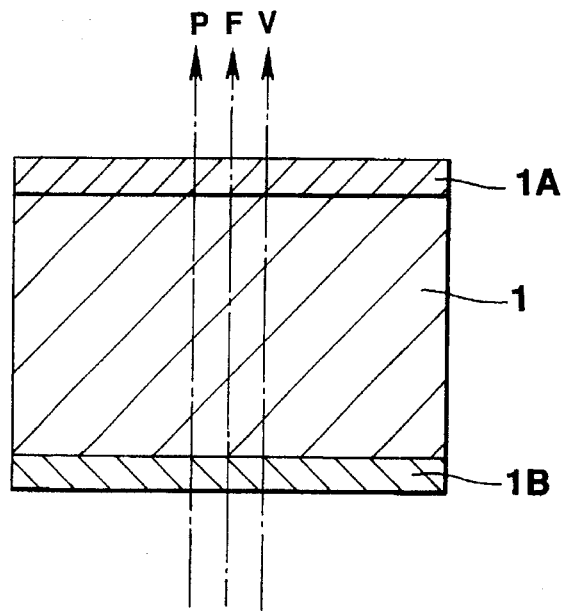
FIG. 6 is an enlarged sectional view of a piezoelectric transducer employed in a conventional pressure sensor.
Figure 7:
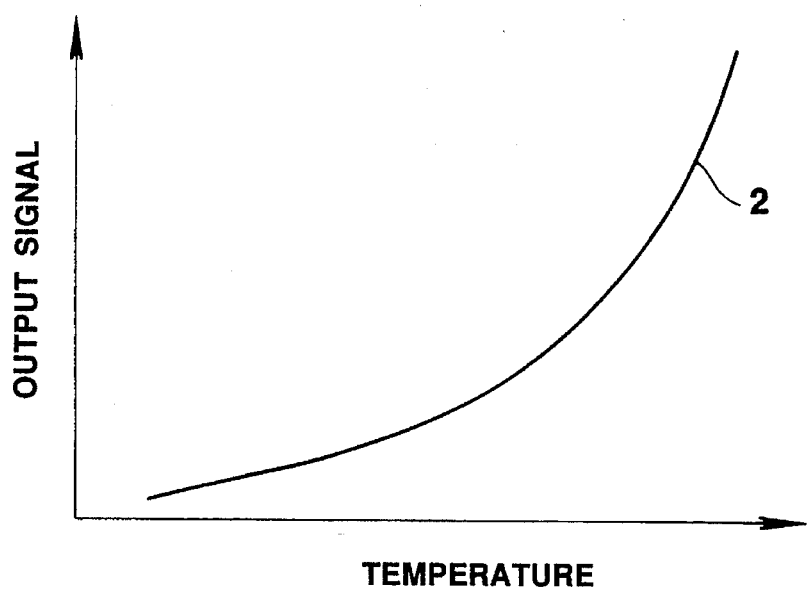
FIG. 7 is a graph showing a characteristic curve of the piezoelectric transducer of FIG. 6.

Referring to FIG. 5 of the drawings, there is shown a modification of the pressure sensor of the invention. In this modification, the smaller diameter cylindrical portion 13' of the casing proper 12 has a closed thinner end 13B'. Thus, the pressure change in the combustion chamber can flex the thinner end 13B', which induces the axial movement of the transmission rod 15.

Furthermore, if desired, the upper and lower electrodes 21A and 21B of the dielectric member 21 may be omitted. In this case, however, the upper and lower surfaces of the dielectric member 21 should be polished, and a relatively soft metal such as copper or the like should be used as the material of the upper plate 22.

In the following, advantages of the present invention will be described.

First, because of usage of the dielectric member 21 which substantially cancels the undesired phenomenon of the piezoelectric transducer 20, the pressure sensor of the invention can detect the pressure with accuracy.

Second, since there is no need of fixing a temperature sensor to the pressure sensor, the pressure sensor can be made compact in size and the control unit can have a simple construction.

Third, since the major parts (viz., 12, 15, 16, 17, 20, 21, 22 and 23) of the pressure sensor are coaxially arranged in a manner as has been described hereinabove, the pressure sensor can be assembled with ease. In fact, by only putting the parts into the casing proper 12 one after another from the open upper end of the casing proper 12, they can be positioned automatically.

What is claimed is:

1. A pressure sensor for detecting pressure in a high temperature environment, comprising:

a cylindrical casing having a diaphragm portion, said diaphragm portion including a cylindrical portion and a closed end integrally connected to one axial end of said cylindrical portion, said cylindrical portion having a thin wall such that said cylindrical portion axially expands and contracts together with said closed end upon being exposed to an external pressure;

a transmission rod received in said cylindrical casing, said transmission rod being engaged at one end with said closed end so that said transmission rod is axially moved upon expansion and contraction of said cylindrical portion of the diaphragm portion;

a stopper fixed in said cylindrical casing in such a manner as to define a given clearance between the stopper and the other end of said transmission rod;

a piezoelectric plate member having opposed electrodes;

a dielectric plate member having opposed electrodes, the capacitance characteristic of said dielectric plate member relative to a temperature being opposite to that of said piezoelectric plate member, said dielectric plate member being directly placed on said piezoelectric plate member in such a manner that one of the electrodes of said dielectric plate member is mated with one of the electrodes of said piezoelectric plate member;

said piezoelectric plate member and said dielectric plate member forming a unit, said unit being located in said given clearance in such a manner that when, due to the axial movement of the cylindrical portion of the diaphragm portion, said transmission rod is moved toward and away from said stopper, said unit is compressed and relaxed in a direction along which said piezoelectric plate member and said dielectric plate member are aligned; and means for establishing both a first electrical connection between the other electrode of said piezoelectric plate member and an external electric device and a second electrical connection between the other electrode of said dielectric plate member and said external electric device.

2. A pressure sensor as claimed in claim 1, wherein said piezoelectric plate member and said dielectric plate member are annular in shape.

3. A pressure sensor as claimed in claim 1, wherein said piezoelectric plate member is constructed of lead titanate.

4. A pressure sensor as claimed in claim 3, wherein said dielectric plate member is constructed of strontium titanate.

5. A pressure sensor as claimed in claim 1, wherein a voltage is established between said first electrical connection and said second electrical connection, said voltage being substantially proportional to the axial movement of said transmission rod.

6. A pressure sensor as claimed in claim 5, wherein the proportional relationship between said voltage and said axial movement of said transmission rod is substantially constant for all operational temperatures.

7. A pressure sensor as claimed in claim 1, further comprising tightening means for assuring a tight mechanical connection between said piezoelectric plate member and said dielectric plate member.

8. A pressure sensor as claimed in claim 7, wherein said tightening means comprises:
a lower plate constructed of electrically and thermally insulated material, said lower plate being put on the other end of said transmission rod;
a contact plate constructed of conductive material, said contact plate being put on said lower plate and supporting said piezoelectric plate member and said dielectric plate member; and
an upper plate constructed of conductive material, said upper plate being tightly sandwiched between said dielectric plate member and said stopper, said stopper being constructed of a metal.

9. A pressure sensor as claimed in claim 8, wherein said contact plate, said piezoelectric plate member, said dielectric plate member, said upper plate and said stopper are substantially annular in shape.

10. A pressure sensor as claimed in claim 9, wherein said contact plate is integrally formed with a rod portion, said rod portion extending in a direction away from said transmission rod through aligned openings respectively formed in said piezoelectric plate member, said dielectric plate member, said upper plate and said stopper.

11. A pressure sensor as claimed in claim 10, wherein said rod portion has an insulating tube disposed thereabout.

12. A pressure sensor as claimed in claim 11, wherein said rod portion has an upper part connected to a lead cable.

13. A pressure sensor as claimed in claim 1, wherein said stopper is a cylindrical screw operatively engaged with an internal thread formed on an inner cylindrical surface of said cylindrical casing.

14. A pressure sensor as claimed in claim 1, wherein said closed end of the cylindrical portion of said diaphragm portion has a thickness greater than that of the wall of said cylindrical portion.

15. A pressure sensor as claimed in claim 1, wherein said closed end of the cylindrical portion of said diaphragm portion has a thickness smaller than that of the wall of said cylindrical portion.

16. A pressure sensor as claimed in claim 1, wherein said cylindrical casing has an upper end closed by an upper cover.

17. A sensor operating in a high temperature environment, comprising:
a piezoelectric plate member having opposed electrodes;
a dielectric plate member having opposed electrodes, a capacitance characteristic of said dielectric plate member relative to a temperature being opposite to a capacitance characteristic of said piezoelectric plate member, said dielectric plate member being directly placed on said piezoelectric plate member in such a manner that one of the opposed electrodes of said dielectric plate member is mated with one of the opposed electrodes of said piezoelectric plate member, said piezoelectric plate member and said dielectric plate member forming a unit; and
means for establishing both a first electrical connection between the other of the opposed electrodes of said piezoelectric plate member and an external electric device and a second electrical connection between the other of the opposed electrodes of said dielectric plate member and said external electric device.

18. A sensor as claimed in claim 17, wherein said piezoelectric plate member and said dielectric plate member are annular in shape.

19. A sensor as claimed in claim 17, wherein a voltage is established between said first electrical connection and said second electrical connection, said voltage being substantially proportional to a phenomenon being sensed by the sensor, wherein the proportional relationship between said voltage and said sensed phenomenon is substantially constant for all operational temperatures.

20. A sensor as claimed in claim 17, wherein the sensor is a pressure sensor, and when the unit is compressed in response to a pressure a voltage between said first electrical connection and said second electrical connection is produced, said voltage being substantially proportional to said pressure for all operational temperatures.

21. A sensor as claimed in claim 18, wherein the sensor is a pressure sensor, and when the unit is compressed in response to a pressure a voltage between said first electrical connection and said second electrical connection is produced, said voltage being substantially proportional to said pressure for all operational temperatures.

* * * * *